United States Patent
Phillips et al.

(10) Patent No.: US 7,539,863 B2
(45) Date of Patent: *May 26, 2009

(54) REMOTE SERVICES FOR PORTABLE COMPUTING ENVIRONMENT

(75) Inventors: Thomas G Phillips, Bellevue, WA (US); Christopher A Schoppa, Redmond, WA (US); William J Westerinen, Sammamish, WA (US); Mark A Myers, Fall City, WA (US)

(73) Assignee: Microsoft Corporation, Redmond, WA (US)

( * ) Notice: Subject to any disclaimer, the term of this patent is extended or adjusted under 35 U.S.C. 154(b) by 819 days.

This patent is subject to a terminal disclaimer.

(21) Appl. No.: 10/983,050

(22) Filed: Nov. 4, 2004

(65) Prior Publication Data

US 2006/0085527 A1    Apr. 20, 2006

Related U.S. Application Data

(63) Continuation of application No. 10/966,428, filed on Oct. 15, 2004.

(51) Int. Cl.
*G06F 9/00* (2006.01)
*G06F 11/30* (2006.01)

(52) U.S. Cl. ............... 713/168; 713/1; 713/2; 713/156; 713/159; 713/165; 713/171; 713/172; 713/173; 713/182; 713/183; 713/186; 713/190; 713/191; 713/192; 713/193; 726/2; 726/3; 726/4; 726/5; 726/7; 726/9; 726/12; 726/19; 726/20; 380/277; 709/212; 709/217; 709/219; 709/229

(58) Field of Classification Search .............. 713/1–2, 713/168, 182
See application file for complete search history.

(56) References Cited

U.S. PATENT DOCUMENTS

| | | | |
|---|---|---|---|
| 2002/0147912 A1* | 10/2002 | Shmueli et al. | 713/182 |
| 2002/0193101 A1* | 12/2002 | McAlinden | 455/419 |
| 2003/0048473 A1 | 3/2003 | Rosen | |
| 2003/0084104 A1* | 5/2003 | Salem et al. | 709/205 |
| 2003/0208573 A1 | 11/2003 | Harrison et al. | |
| 2004/0001088 A1* | 1/2004 | Stancil et al. | 345/748 |
| 2004/0205357 A1* | 10/2004 | Kuo et al. | 713/200 |
| 2005/0182921 A1* | 8/2005 | Duncan | 713/1 |

FOREIGN PATENT DOCUMENTS

| | | |
|---|---|---|
| EP | 1223722 A | 7/2002 |
| EP | 1233337 A | 8/2002 |

OTHER PUBLICATIONS

Flonix :: USB desktop OS Solutions Provider, website http://www.flonix.com, Copyright © 2004 Flonix France.

Migo by PowerHouse Technologies Group, website http://www.4migo.com, Copyright © 2003-2005 PowerHouse Technologies Group, Inc. USA.

(Continued)

*Primary Examiner*—Kambiz Zand
*Assistant Examiner*—Jenise E Jackson

(57) ABSTRACT

The described systems, methods and data structures are directed to a portable computing environment. A communication link is established between a portable device and a host device. The portable device is equipped with a processing unit and is configured to execute a process that is accessible by the host device. The host device includes an application configured to interact with the process on the portable device. The process on the portable device provides data to the application on the host device using the communication link. The application uses the data to provide a computing environment.

32 Claims, 12 Drawing Sheets

OTHER PUBLICATIONS

WebServ USB, website http://www.webservusb.com, © 2004 ItWorks.

EP Search Report for Patent Application No. 05109616.2 mailed Jan. 2, 2008, Pages 9.

* cited by examiner

REMOTE SERVICES FOR PORTABLE COMPUTING ENVIRONMENT

CROSS-REFERENCE TO RELATED APPLICATION

This application is a continuation of and claims the benefits of prior U.S. patent application Ser. No. 10/966,428 filed Oct. 15, 2004, titled "PORTABLE COMPUTING ENVIRONMENT", the contents of which are hereby incorporated by reference.

BACKGROUND OF THE INVENTION

Personal Computer (PC) has traditionally been designed for use by a single individual. A user typically can select and configure the software installed on a PC to maintain the computer's stability, performance and personal preferences. However, when a PC is shared by multiple users, the different requirements of these users often have an adverse impact on the system. For example, different users may wish to install different applications, which may not be compatible with one another. Also, one user may wish to configure the operating environment in the shared PC in a certain manner that is not acceptable by another user. Furthermore, multiple users sharing a PC can cause security problems.

One available system involves storing an operating system and software on a uniform serial bus (USB) flash memory drive. The system is similar in conception to a portable drive that contains data that is generally stored in an internal hard drive of a PC. However, this system relies on the shared PC to execute the software stored on the USB drive. For example, the operating system on the USB drive may have to be booted up from the shared PC, which still creates performance and security issues. Also, the software in the USB drive may have to be loaded onto the hard drive of the PC, which is a time consuming process and may lead to more performance and security concerns.

A system that provides a portable and device-independent computing environment for use in a shared PC continues to elude those skilled in the art.

SUMMARY OF THE INVENTION

The described systems, methods and data structures are directed to a portable computing environment. A communication link is established between a portable device and a host device. The portable device is equipped with a processing unit and is configured to execute a process that is accessible by the host device. The host device includes an application configured to interact with the process on the portable device. The process on the portable device provides data to the application on the host device using the communication link. The application uses the data to provide a computing environment.

In one aspect, the computing environment is dynamically created on the host device by the portable device. Data provided by the portable device, the host device, or network servers may be used alone or in conjunction to provide this dynamic computing environment.

In another aspect, the portable device may interact with applications provided by network servers. These applications may provide various types of services, such as activation services, authentication services, backup services, updating services, content downloading services, or diagnostic services. For example, the states stored in the portable device may be synchronized with data on a network server for updating or backup purposes.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
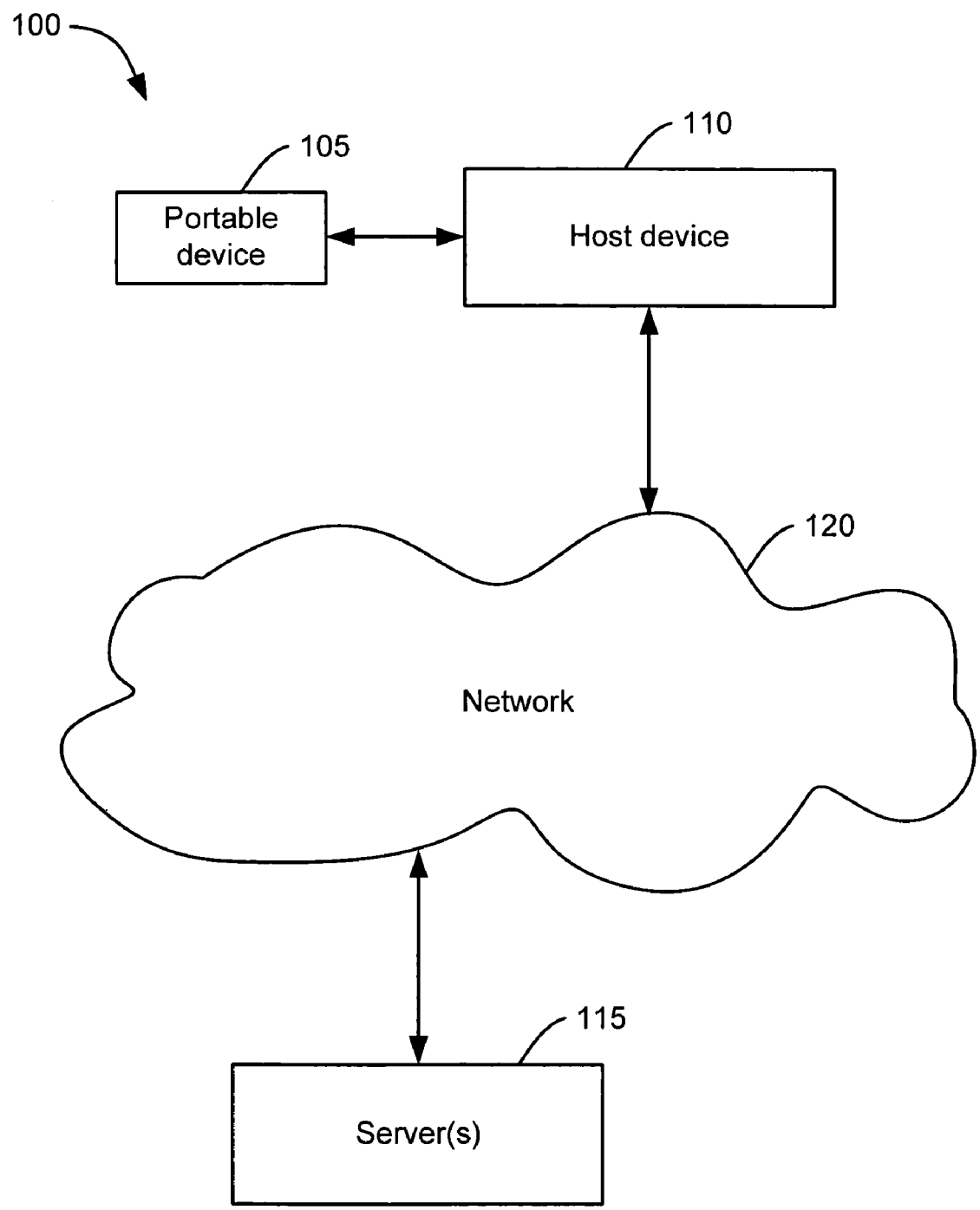
FIG. 1 shows an example portable computing environment system.

FIG. 1 shows a portable computing environment system 100. System 100 includes a portable device 105 and host device 110. Both devices may communicate with server 115 through network 120. Portable device 105 is a computing device configured to execute processes that can interact with applications executing on other computing devices. Portable device 105 typically executes these processes using a computing module within the portable device 105. For example, the computing module in portable device 105 may include one or more processor units and memory. Portable device 105 may be configured with non-volatile storage for storing various types of information, such as states associated with applications, operating environment, user data, authentication data, and the like.

Portable device 105 may be connected to host device 110 using any type of connection mechanisms. For example, portable device 105 may be configured to connect to a port of the host device 110, such as a Universal Serial Bus (USB) port, an IEEE 1394 (i.e. fire wire) port, a serial port, a parallel port, a network port, a peripheral connection, or the like. Portable device 105 may also be connected to host device 110 using a wireless connection, such as Wi-Fi, Bluetooth, Infrared, or other radio frequency (RF) or optical connections.

The processes executed by portable device 105 may include any type of applications, such as application services. The term "application service" or "web service" means an application that is capable of interacting with other applications through one or more protocols, such as network protocols. Typically, application services are configured to send data to or receive data from applications through any type of networks. An application service may be identified by an identifier, such as an Internet Protocol (IP) address or a Uniform Resource Locator (URL), so that other applications can readily locate and communication with the application service.

Application services may also be configured to facilitate communication between applications that are executing on difference types of devices and operating environments. Application services may communicate with other applications using various universal standards. For example, application services may use Extensible Markup Language (XML) to tag data, Simple Object Access Protocol (SOAP) to transfer the data, Web Services Description Language (WSDL) to describe the services available, or Universal Description, Discovery and Integration (UDDI) to list what services are available. The application services may be implemented in any type of software code, such as XML.

Portable device 105 may be configured to provide a computing environment to an application on host device 110. For example, a process on portable device 105 may configure the computing environment on the host device to the desired settings of a particular user associated with portable device 105. In one implementation, the computing environment may be dynamically executing on the host device in a temporary manner. The states on the host device may not be permanently changed by the computing environment provided by portable device 105. Host device 110 may be configured to restore to a previous setting when portable device 105 is disconnected from the host device. Since the states associated with the computing environment are stored on portable device 105, host device 110 may be configured not to retain any state associated with that environment. The ability to provide a temporary computing environment enables host device 110 to be conveniently and securely shared by multiple users.

Portable device 105 may be configured to interact with other computing devices through network 120, such as server 115. Portable device 105 may use the communication link established between host device 110 and network 120 to communicate with server 115. Although portable device 105 can independently provide services to host device 110, portable device 105 may be configured to provide these services in conjunction with server 115 to create a more dynamic and content-rich environment. For example, portable device 105 may be configured to employ data and web services from server 115 to augment the computing environment directly provided by portable device 105 to host device 110. Portable device 105 may also be configured to proxy the access to a computing environment provided by server 115. In either configuration, the computing environment is typically provided to host device 110 from portable device 105, and not directly from server 115.

Portable device 105 may be configured to determine the capabilities of host device 110. Portable device 105 may configure processes executing on the device to provide data based on the capabilities of host device 110. For example, portable device 105 may determine the display capabilities of host device 110, such as screen size, resolution, or the like. The processes in portable device 105 may provide data that can be properly displayed on host device 110.

Portable device 105 may be configured to interact with server 115 for any kind of services. For example, portable device 105 may receive updated states for applications from server 115 and provides the updated applications to host device 110. The updated states may include upgrades for existing states, new states, or states with some data being deleted. Portable device 105 may be configured to receive a portion of the states for the device that are updated. Portable device 105 may be also configured to receive a new batch of states that replaces all of the existing states in portable device 105. Portable device 105 may further be configured to store states on server 115. The states may be stored and retrieved as a part of the normal operations of portable device 105 or as backup copies.

Portable device 105 may be configured to determine whether the states in the device are valid. The states may be invalid if certain conditions are not met. For example, the states in the portable device 105 may be invalid after a certain period of time, a certain level of use, a certain task has been performed, or the like. The validity of the states may be associated with a term of use, such as a licensing period. In one implementation, portable device 105 may include a timing device. Portable device 105 may be configured to determine an expiration time associated with the states and a current time from the timing device. If the expiration time has passed relative to the current time, portable device 105 may determine that the states have expired and may deny access to the states. Portable device 105 may be configured to revalidate the states. For example, portable device 105 may enable a user to renew a license associated with the states stored in the device.

Portable device 105 may also be configured with mechanisms to provide security. These security mechanisms may include functionalities associated with a Certificate Authority (CA). For example, portable device 105 may include keys (e.g. public/private keys) associated with a digital certificate from a CA. The keys may be used by authorized users to perform authentication with portable device 105. The data stored in portable device 105 may be encrypted with these keys so that only properly authenticated, authorized users may access the data.

To protect the security mechanisms, portable device 105 may be configured to incorporate the functionalities associated with the CA within components of portable device 105. For example, the CA functionalities may be embedded in a computing module of portable device 105. In this configuration, the keys associated with the CA would not appear as elements in the software stack maintained by portable device 105 and, thus, cannot be easily compromised by a software hack. The keys in this configuration may be forcibly obtained only through a physical reconfiguration of portable device 105.

Portable device 105 may be configured to receive authentication data in any type of input mechanism. For example, portable device 105 may receive authentication data from host device 110, which may provide an input interface for users to input the authentication data. Portable device 105 may also be configured with an input interface so that users can directly input the authentication data into the portable device 105. The input interface on host device 110 or portable device 105 can include any type of interface configured to enable users to enter authentication data. For example, the authentication input interface may include a keypad, a biometric reader, an image recognition device, or other input mechanisms. The biometric reader may include a fingerprint reader, a retina scanner, a voice-recognition device, a chemical detector, or the like. Portable device 105 may be configured to receive the data from the authentication input interface and authenticate a user using the data.

Portable device 105 may also be configured to receive executable instructions (or codes) from host device 110 or server 115. To avoid executing malicious codes, legitimate codes may be identified by authentication data, such as a key. For example, the legitimate codes may be encrypted with a key that can be decrypted using a corresponding key embedded within the processing unit of portable device 105. Portable device 105 may be configured to only execute codes that are properly encrypted with the correct key.

Portable device 105 may further be configured to interact with server 115 to perform security checks. For example, portable device 105 may enable server 115 to authenticate a user that requests access to portable device 105. Authentication data such as user names, passwords, personal information, biometric data, images, keys, or the like, may be sent to server 115 for authentication. Server 115 may also be configured to verify the states in portable device 105 before giving authorization for portable device 105 to perform normal operations.

Host device 110 is a computing device arranged to execute an application that is configured to interact with a process on portable device 105. The application may include a user-interface that enables a user to interact with a process on portable device 105 For example, host device 110 may provide a browser that interacts with the application service executing on the portable device 105.

Host device 110 may be any type of computing device, such as a desktop computer, a laptop or notebook computer, a personal digital assistant (PDA), a wireless phone, a kiosk, or the like. Also, since the requirements for host device 110 are minimal, computing devices that have some processing and output capabilities but that have not traditionally been used to provide computing functionalities to users may also serve as host device 110. For example, host device 110 may be a printer, a household appliance, audio or video equipment, electronic watches, or the like.

Host device 110 typically includes mechanisms for detecting and connection with portable device 105. For example, portable device 105 may be automatically detected by host device 110 through a wired connection (such as USB or fire wire) or a wireless connection (such as RF, BlueTooth, WiFi or optical media). In one implementation, host device 110 identifies portable device 105 as a network device and establishes a connection between the devices using network protocols over the actual physical communication mechanism.

Host device 110 may be configured to receive instructions from portable device 105. The instructions may be executed to provide an operating environment on host device 110. For example, host device 110 may receive instructions from portable device 105 to launch a browser, which is configured to connect to an IP address or URL associated with an application service provided by portable device 105.

Host device 110 may include a network interface for establishing a communication link with network 120. Host device 110 may be configured to enable portable device 105 to connect to network 120 using this communication link. Network 120 may include any type of networks, such as local area network (LAN), wide area network (WAN), the Internet, or the like.

Figure 2:
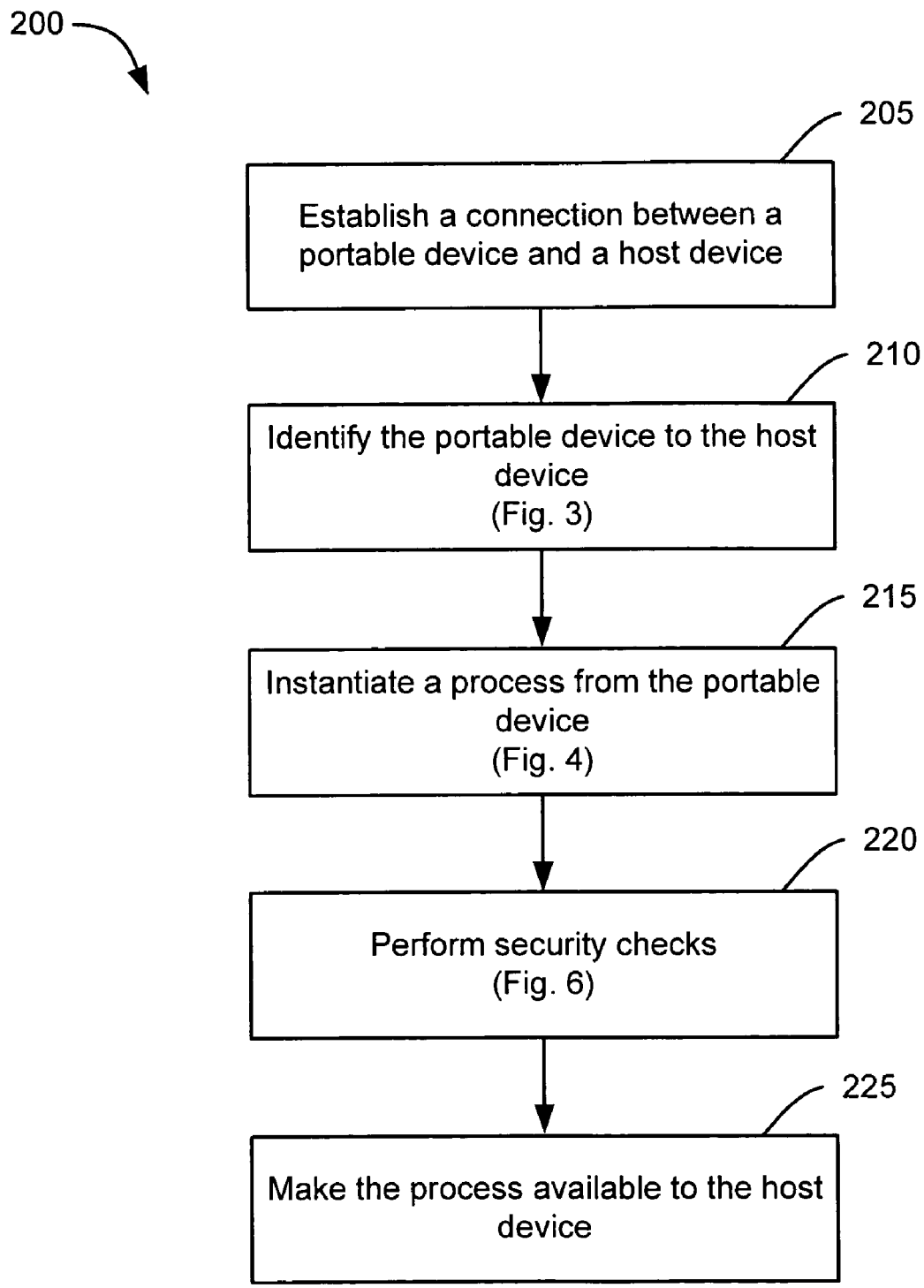
FIG. 2 shows an example process for providing a device-independent computing environment to a computing device.

FIG. 2 shows an example process 200 for providing a device-independent computing environment to a computing device. Process 200 may be used by a portable device to provide the computing environment to a host device. At block 205, a connection is established between a portable device and a host device. The connection may be any type of wired or wireless connections, such as fire wire, network, USB, Wi-Fi, RF, Bluetooth, Infrared, or the like.

At block 210, the portable device is identified to the host device. The devices may be configured with a protocol (e.g. USB) that automatically identifies the portable device when it is connected to the host device. An example process for identifying the portable device to the host device will be discussed in conjunction with FIG. 3.

At block 215, a process is instantiated on the portable device. The process may include one or more sub-processes. The process may be any type of processes that can interact with other processes in other devices. In one implantation, the process is an application service or web service. An example process for instantiating a process on a portable device will be discussed in conjunction with FIG. 4.

At block 220, optional security checks may be performed. The security checks may include any type of authentication and authorization processes for users and applications. For example, the security checks may include verifying a CA digital certificate associated with the portable device. An authentication process may be performed to authenticate the keys associated with the digital certificate. An example process for performing security checks on a portable device will be discussed in conjunction with FIG. 6.

At block 225, the process instantiated by the portable device is made available to the host device. For example, the process may be accessible from the host device through an application provided by the host device. The portable device may provide data to the host device for configuring the application (e.g. a user-interface) on the host device to interact with the process on the portable device. In one implementation, the process instantiated by the portable device is an application service. A browser in the host device is configured to interact with the application service by browsing to an IP address or a URL associated with the application service.

Figure 3:
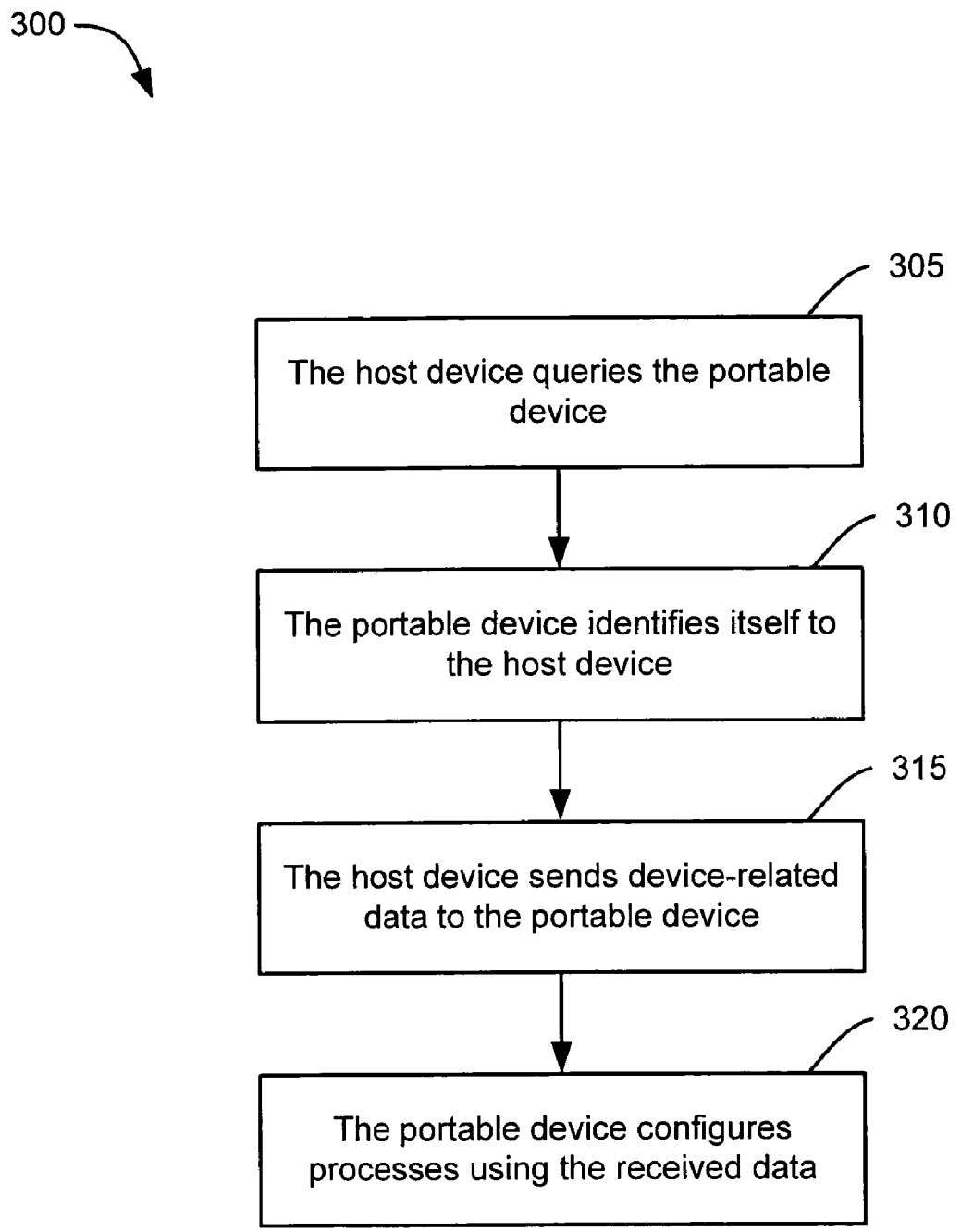
FIG. 3 shows an example process for identifying the portable device to the host device.

FIG. 3 shows an example process 300 for identifying the portable device to the host device. Process 300 begins when a connection has been established between the portable device and the host device. At block 305, the host device queries the portable device. The host device may be configured to automatically detect and queries the portable device using a protocol associated with the connection.

At block 310, the portable device identifies itself to the host device. In one implementation, the portable device may be identified to the host device as a network device. The host device may configure its network settings to accommodate the portable device. For example, the host device may associate a network address with the portable device.

At block 315, the host device sends device-related data to the portable device. The data may include the configurations of the host device, information of other devices within or connected to the host device, one or more IP addresses associated with the host device, and the like.

At block 320, the portable device configures its processes using the data received from the host device. For example, the portable device may associate an IP address or a URL with an application service instantiated on the host device.

Figure 4:
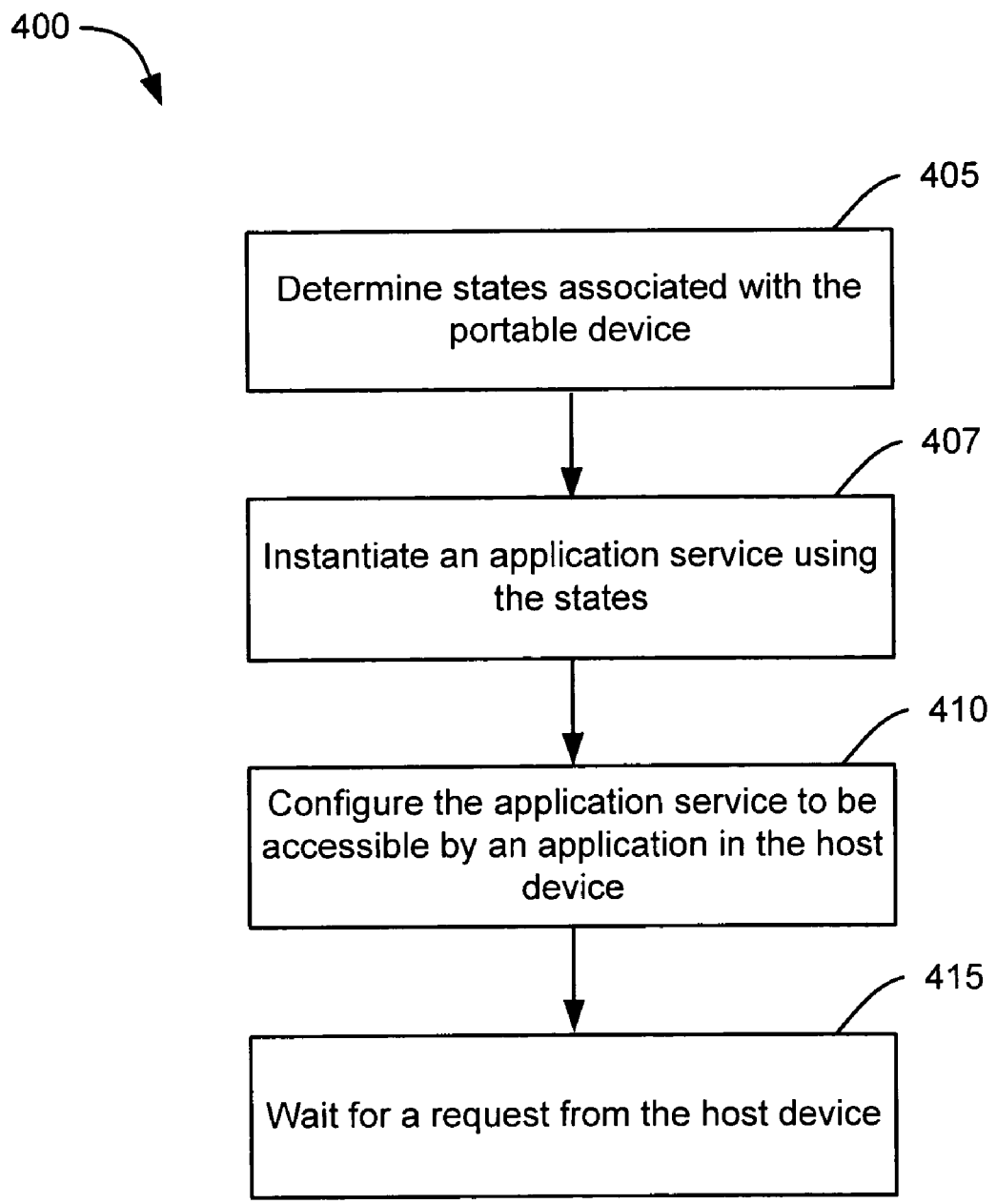
FIG. 4 shows an example process for instantiating a process on a portable device.

FIG. 4 shows an example process 400 for instantiating a process on a portable device. Process 400 may be performed by a portable device during or after a power up process. At block 405, states associated with the portable device are determined. The states may be associated with processes that may be executed on the portable device. For example, the states may include applications, configuration and customization data, user data, or the like. The states may be retrieved from computer-readable media in the portable device, such as flash memory, hard-drive, or other memory storage devices. The states may also be retrieved from a remote server through a communication link provided by the host device.

At block 407, a process, such as an application service, is instantiated using the retrieved states. The process may include any type of application that is accessible by other applications in other devices. At block 410, the application service is configured to be accessible by an application in the host device. For example, the application service may be associated with a web identifier such as an IP address or a URL. At block 415, the portable device waits for a request from the host device. An application from the host device may send a request for interacting with the application service through a user-interface, such as a browser.

It is to be appreciated that the process instantiated by the portable device may be configured to provide a computing environment to an application on the host device. The process on the portable device may configure the computing environment on the host device to the desired settings of a particular user associated with the portable device. In one implementation, the computing environment may be dynamically executed on the host device in a temporary manner. In this implementation, the states on the host device are not permanently changed by the computing environment provided by the portable device.

Figure 5:
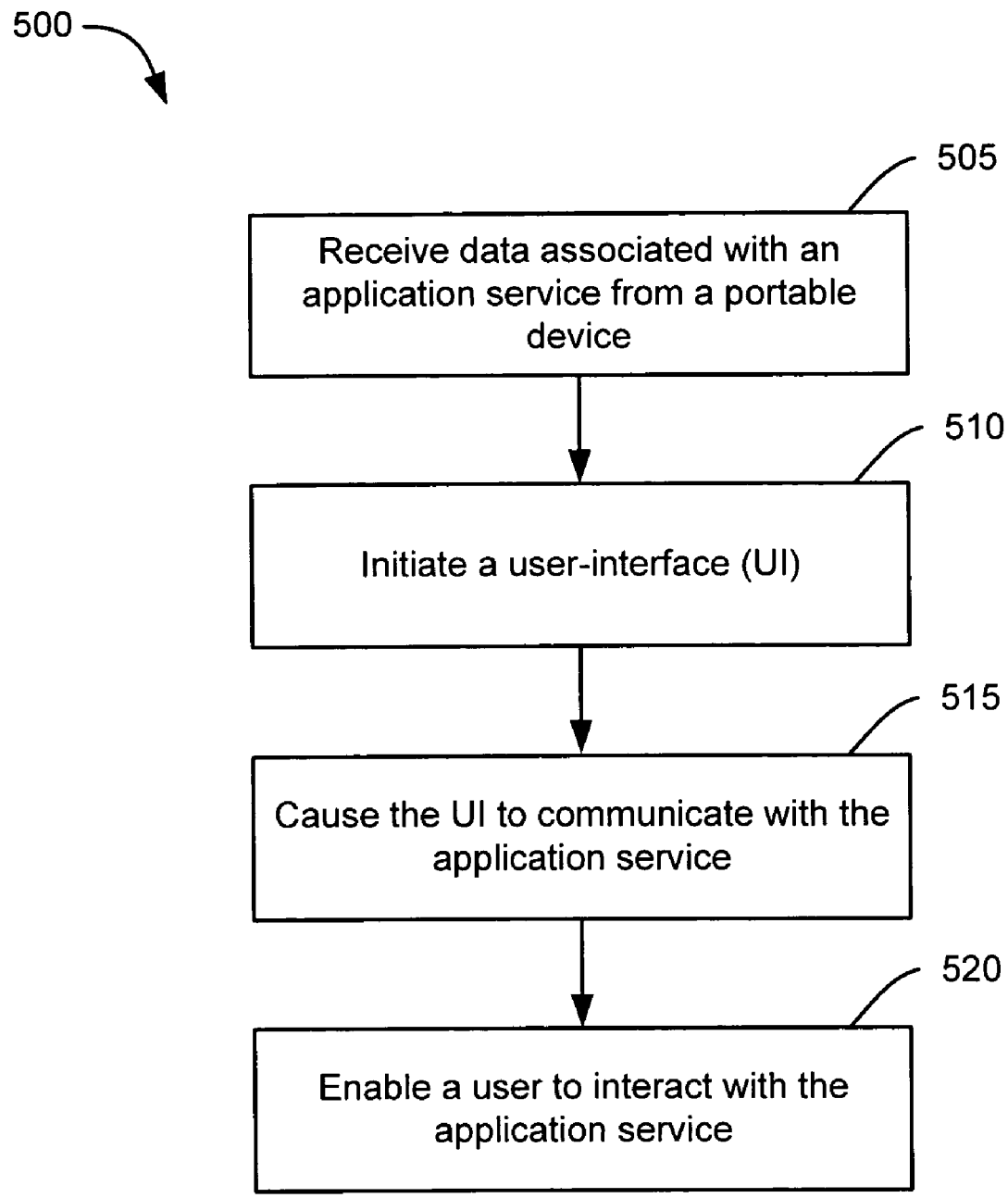
FIG. 5 shows an example process for interacting with a process on a portable device.

FIG. 5 shows an example process 500 for interacting with a process on a portable device. Process 500 may be implemented by a host device to gain access to an application service on the portable device. At block 505, data associated with a process on the portable device is received. The process may include an application service. At block 510, a user-interface is initiated by the host device. The user-interface may include any application that allows user interactions, such as a browser. The user-interface may be initiated in accordance with an auto-launch process that is received from the portable device or is part of the configuration of the host device. In one implementation, the portable device is discovered when the portable device is connected to a host device. The host device may start up a process as instructed by the combination of actions the host device takes when the portable device is discovered. The instructions are made available as the host device accesses the portable device.

At block 515, the user-interface of the host device is caused to communicate with the application service of the portable device. For example, the user-interface in the form of a browser may be configured to browse to an IP address or a URL associated with the application service. At block 520, the user-interface enables a user to interact with the application service.

Figure 6:
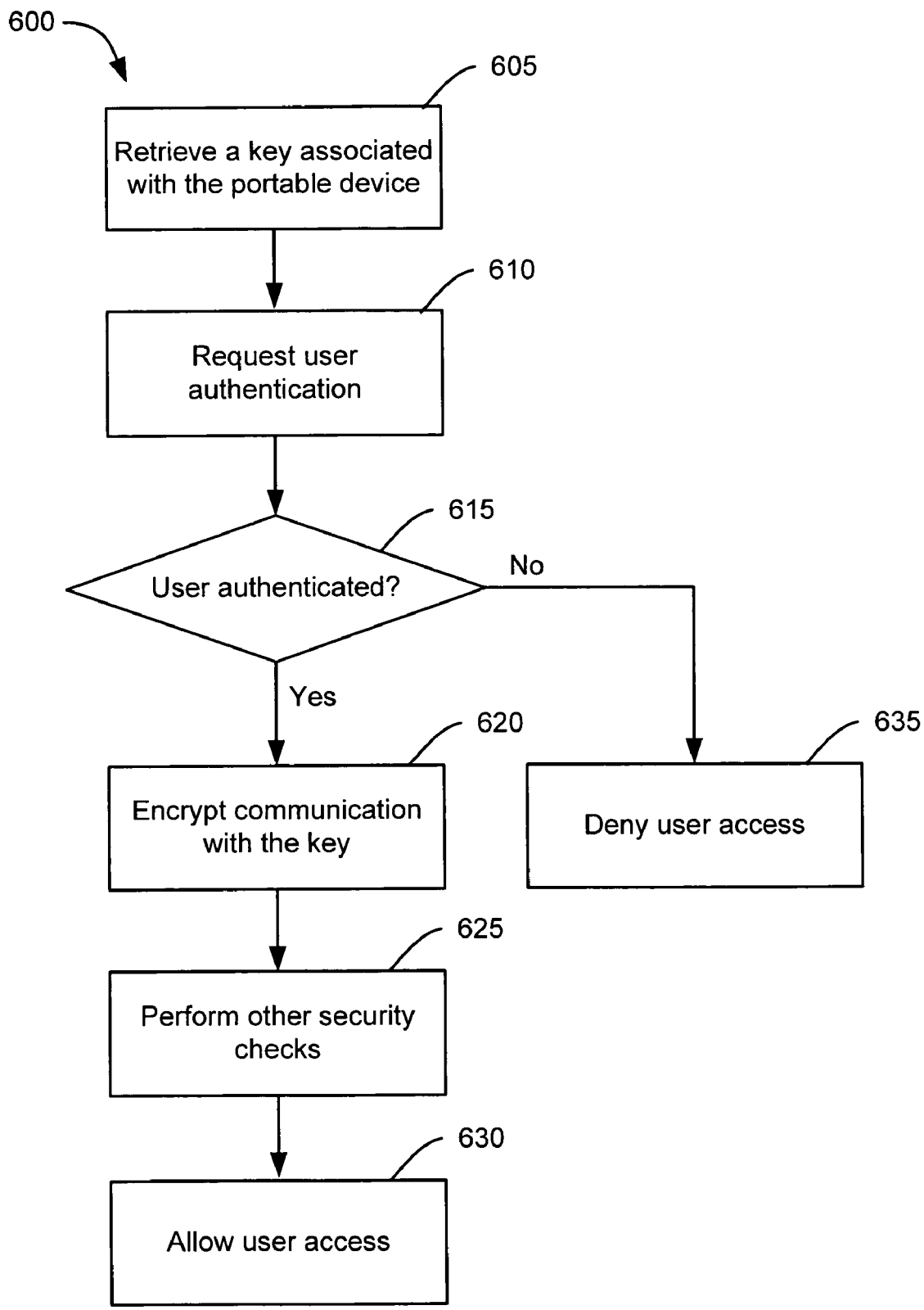
FIG. 6 shows an example process for performing security checks in connection with accessing a portable device.

FIG. 6 shows an example process 600 for performing security checks in connection with accessing a portable device. Process 600 may be performed by a portable device to authenticate an authorized user. At block 605, a key associated with the portable device is retrieved. The key may be associated with a digital certificate of a CA. At block 610, user authentication is requested. Information associated with the key may be required from the user to perform the user authentication. The information may be any type of data, such as a user name, a password, biometric authentication data, or the like.

At decision block 615, a determination is made whether the user is authenticated. If not, then process 600 moves to block 635 where the request for access by the user is denied. If the user is authenticated, process moves to block 620 where communication between the portable device and the host device may be encrypted with the key.

At block 625, other security checks are performed. For example, the portable device may perform security checks by connecting to other application services on a network. These other application services may perform further security operations, such as verifying user authentication, checking user authorization, validating the states within the portable device, or the like. At block 630, if all security checks are successfully performed, the user is allowed to access the application service on the portable device.

Figure 7:
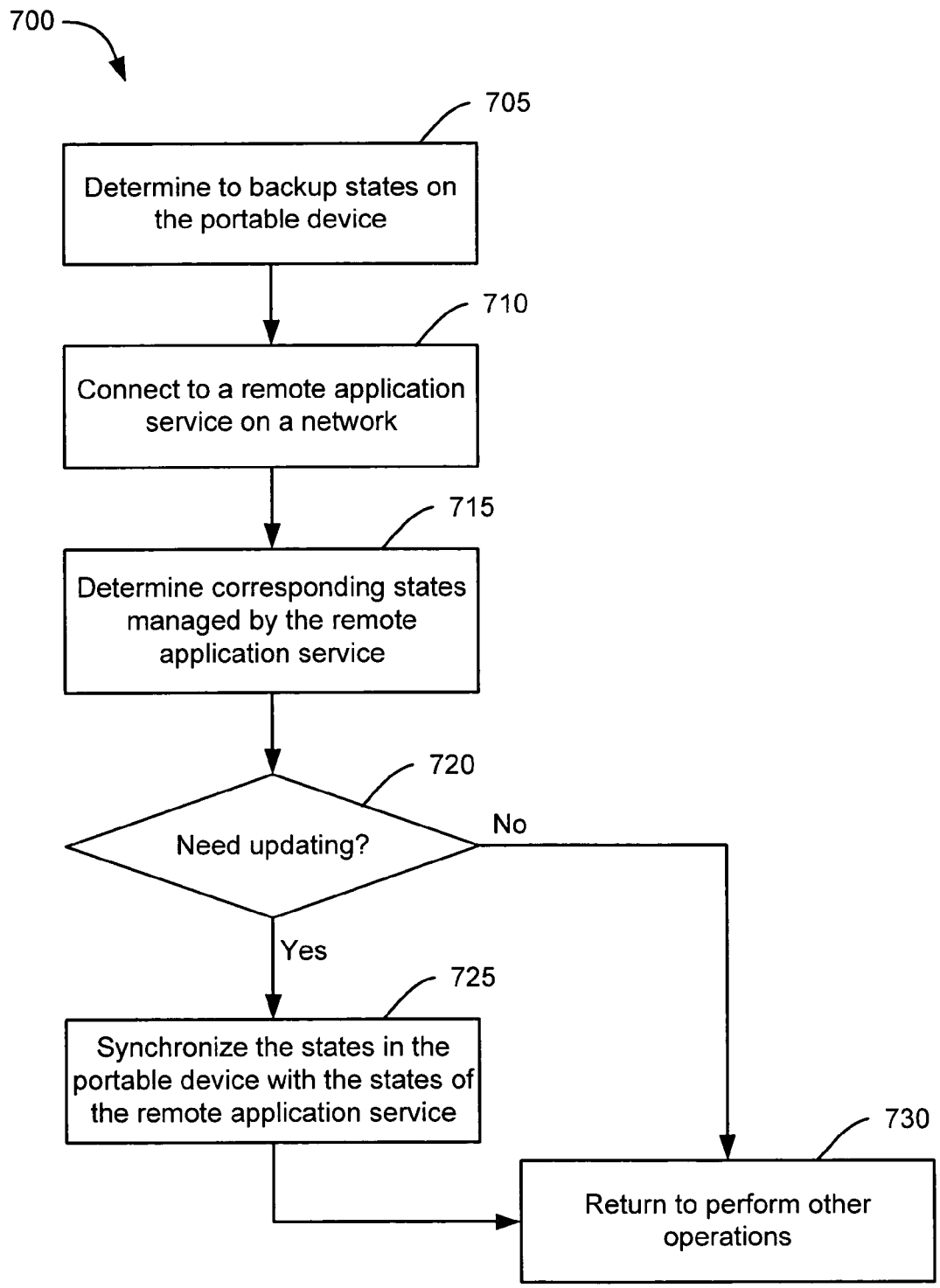
FIG. 7 shows an example process for replicating states of a portable device at a remote location.

FIG. 7 shows an example process 700 for replicating states of a portable device at a remote location. Process 700 may be performed by a portable device to backup states on a network server. These states may include applications, configurations, customization, user data, or the like. At block 705, a determination is made to backup states on a portable device. The determination may be triggered by any condition, such as elapsing a pre-determined time period, exceeding a memory threshold, determining that updated states are available on the server, connecting the portable device to a host device, or the like.

At block 710, the portable device is connected to a remote application service on a network. At block 715, the states managed by the remote application service and corresponding to the portable device are determined. The corresponding states of the remote application service may be backup copies of the states on the portable device. At decision block 720, a determination is made whether updating is needed. For example, updating may be needed if the portable device contains new or modify states that are different from the states corresponding to the portable device on the remote server. If no updating is needed, process 700 moves to block 730. If updating is need, process 700 goes to block 725 where the states in the portable device and the states in the remote application service are synchronized. Process 700 then also continues at block 730 where the process is returned to perform other operations for the portable device.

Figure 8:
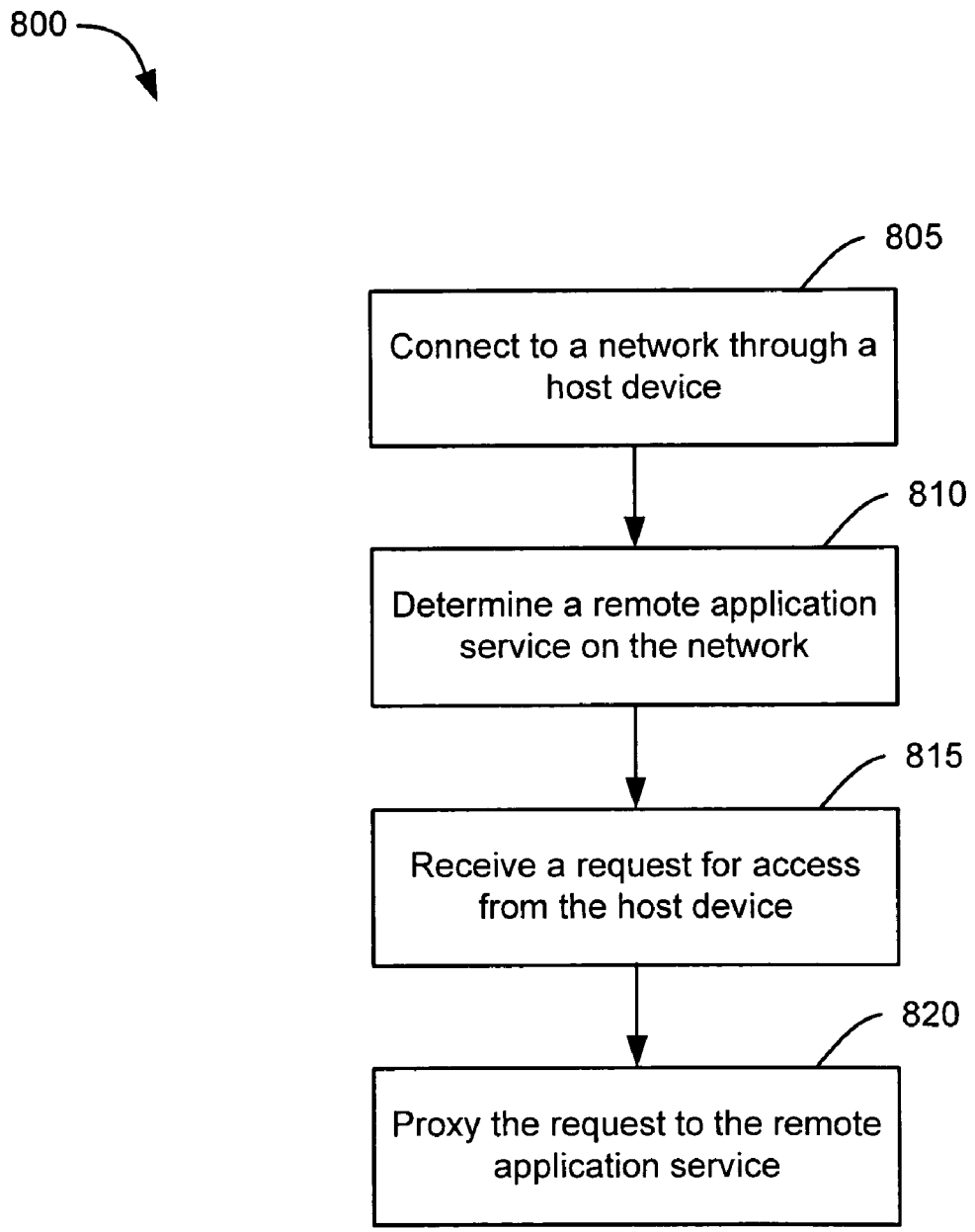
FIG. 8 shows an example process for provide access to application services managed by a server on a network.

FIG. 8 shows an example process 800 for provide access to application services managed by a server on a network. Process 800 may be implemented by a portable device to provide a remote application service to a host device. At block 805, the portable device connects to a network through the host device. The portable device may utilize a communication link that has been established by the host device.

At block 810, a remote application service on the network is determined. The remote application service may include any type of applications. At block 815, a request for access is received from the host device. The request may be responded with functionalities provided by the remote application service. At block 820, the request is sent to the remote application service by proxy. For example, the portable device may present the remote application service to the host device as if the remote application service is executing on the portable device. The portable device may also include the local application service with the remote application service to provide an accelerated or enhanced user experience.

Figure 9:
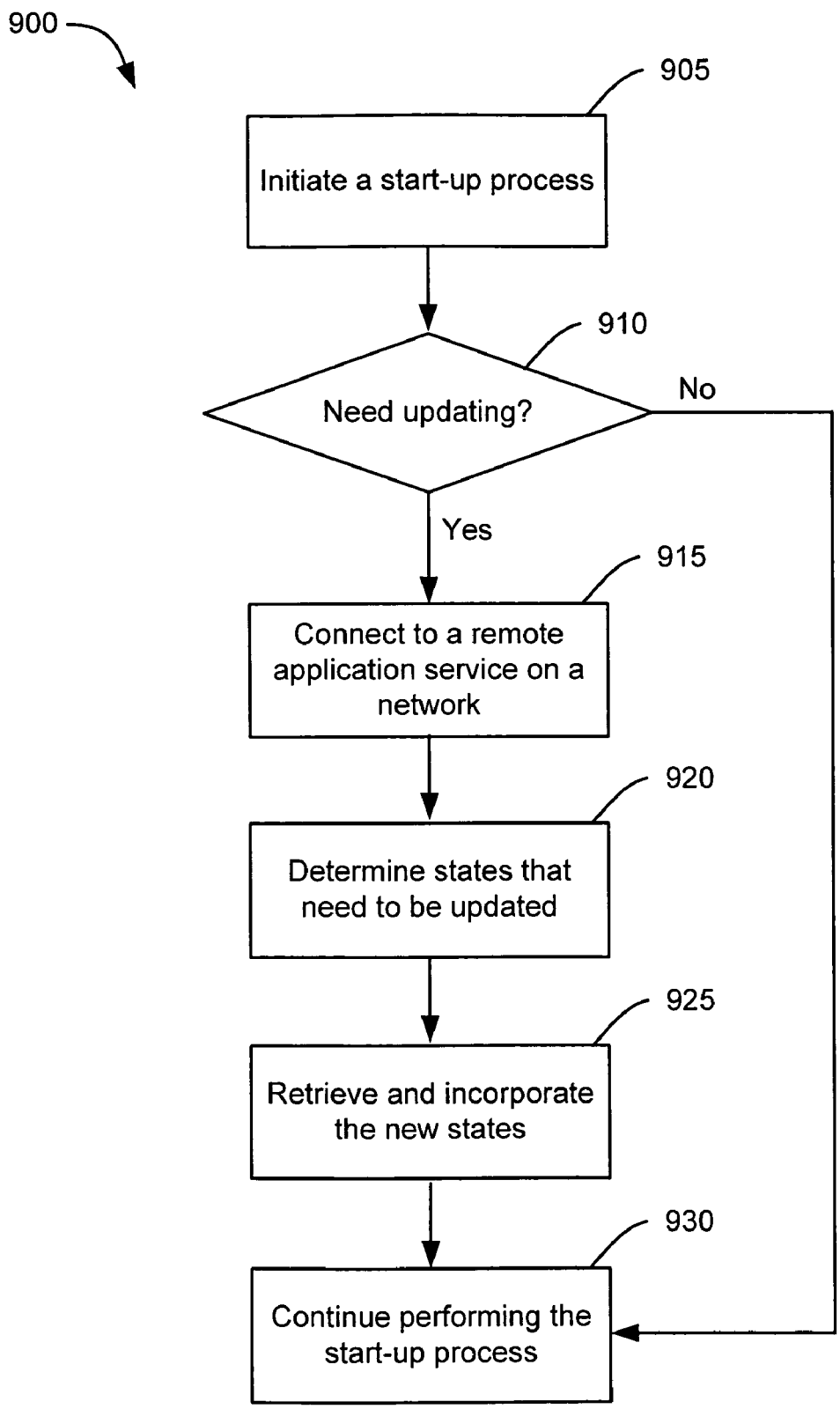
FIG. 9 shows an example process for upgrading the states on a portable device.

FIG. 9 shows an example process 900 for upgrading the states on a portable device. At block 905, a start-up process is initiated on the portable device. At decision block 910, a determination is made whether to update the states in the portable device. For example, the states may require updating after an authorized usage period has expired. If the states in the portable device do not require updating, process 900 moves to block 930.

Returning to decision block 910, if the states in the portable device need updating, process 900 goes to block 915 where a connection to a remote application service is established. The remote application service may be an application of a software management server. At block 920, states that need to be updated are determined. At block 925, the new states are retrieved and incorporated into the portable device. Updating may be performed by replacing a portion of the states or all of the states in the portable device. At block 930, process 900 continues to perform the start-up process.

Figure 10:
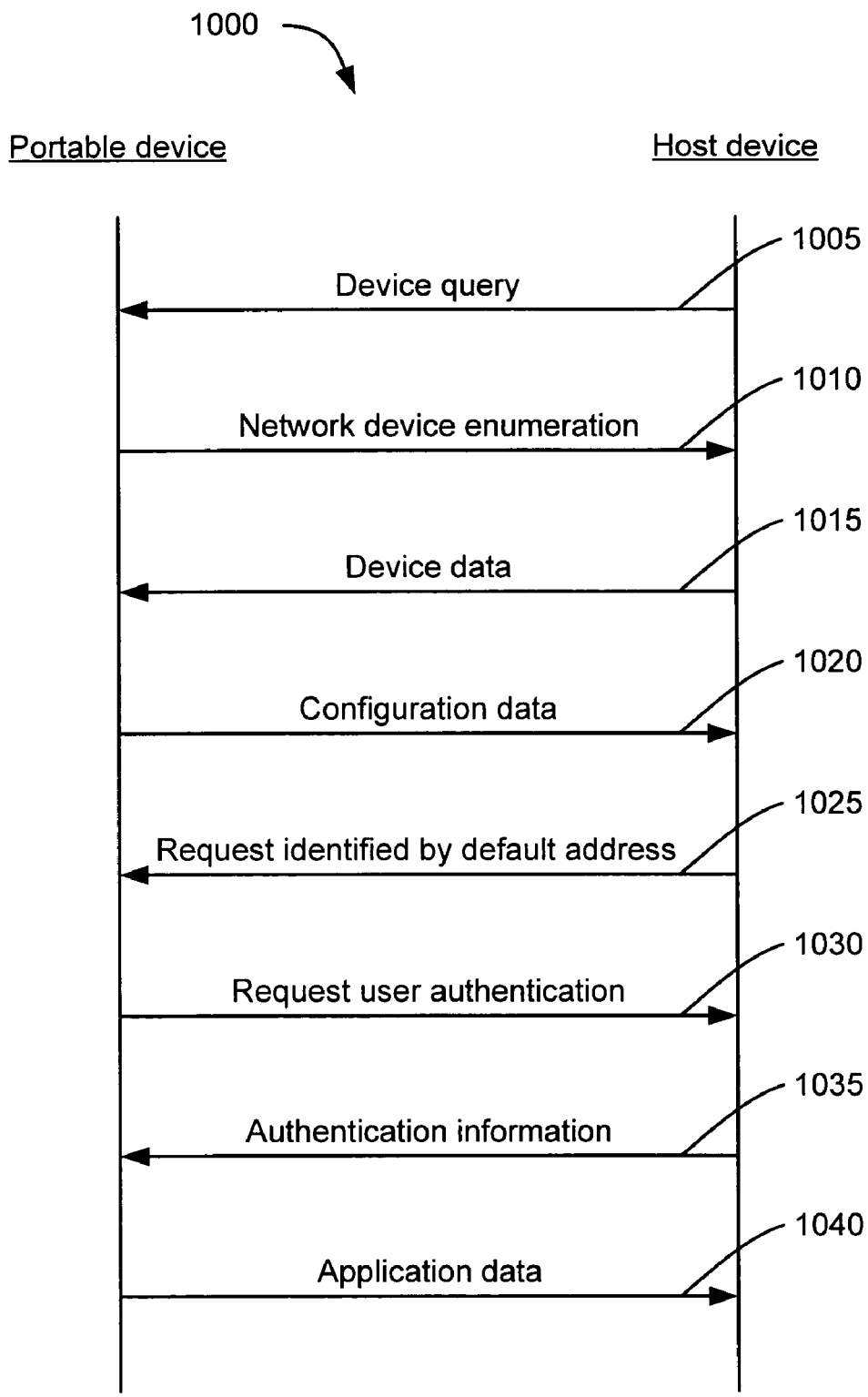
FIG. 10 shows example communications between a portable device and a host device.

FIG. 10 shows example communications 1000 between a portable device and a host device. Example communications 1000 may be implemented in any communication media format and may follow any communication protocol. Example communications 1000 may occur after the portable device has been connected to the host device. The host device may send a message 1005 containing a device query to the portable device. In response, the portable device may send a message 1010 with data for network device enumeration. The host device may use the data to identify and enumerate the portable device as a network-based computing device.

The host device may send a message 1015 with device data to the portable device. The device data may include any type of device information, such as network configuration, IP address associated with the host device, screen size and resolution, or other hardware and software related information. In response, the portable device may send a message 1020 with configuration data to the host device. The configuration data may include instructions for performing operations. For example, the configuration data may include an instruction to launch a browser that sends a request for a page identified by a specified address. The host device may send message 1025 containing a requested identified by an IP address or a URL associated with the portable device.

The portable device may also send a message 1030 that includes a request for user authentication. In response, the host device may send a message 1035 containing authentication information. If the authentication information is valid, the portable device may send a message 1040 with data generated by an application service in the portable device. The host device may present the data to a user using a user-interface, such as a web browser.

Figure 11:
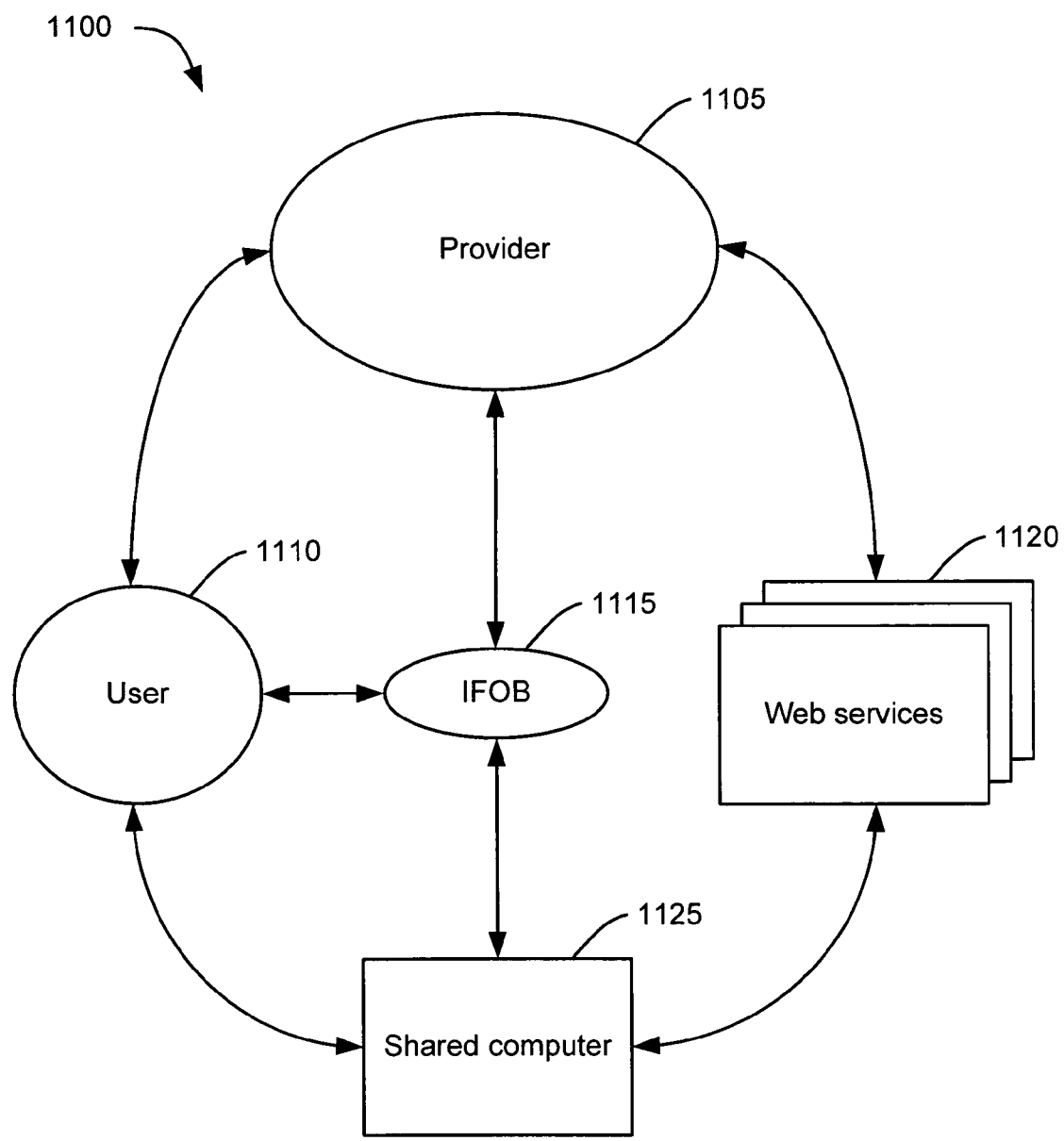
FIG. 11 shows an example system for providing a portable computing environment solution.

FIG. 11 shows an example system 1100 for providing a portable computing environment solution. The portable computing environment solution enables users to create and implement a device-independent and customizable computing environment that is portable. This computing environment is typically provided by a portable computing device and may be implemented on any host device connected to the portable device. The configurations of the computing environment are represented as dynamic states that do not have to be stored on the host device. In this manner, a user can implement his own personalized computing environment onto any device available to him. The portable computing environment solution also enables multiple users to efficiently and securely share a single computer.

Provider 1105 makes the portable computing environment solution available to users, such as user 1110. The portable computing environment solution includes a portable device, such as an intelligent FOB (IFOB) 1115. IFOB 1115 can be any type of device with a memory, a processing unit, and a connection mechanism. For example, IFOB 1115 may be a USB device that includes flash memory for storing states associated with a web service and a processing unit for executing the web service. In one implementation, to simplify the hardware, IFOB 1115 is configured without a display screen or any input means. The portable computing environment solution may also include software that provides web services 1120.

The portable computing environment solution may be provided in any manner. To begin, user 1110 obtains IFOB 1115 from provider 1105 or another party. User 1110 may request provider 1105 to activate portable device 1115. In response, provider 1105 may provide an access mechanism to user 1110 to activate portable device 1115. For example, provider 1105 may provide a code to active the processes in the portable device 1115. Provider 1105 may also active the portable device 1115 by connecting to and configuring the device. Portable device 1115 may be activated by directly connecting to a device managed by provider 1105 or by connecting through shared computer 1125.

To manage and maintain portable device 1115, provider 1105 may configure IFOB 1115 to connect to web services 1120. Web services 1120 are managed by provider 1105 and may perform any services for portable device 1115, such as activation services, authentication services, backup services, updating services, content downloading services, diagnostic services, or the like.

Provider 1105 may also supply services for configuring shared computer 1125. For example, provider 1105 may provide software that enables shared computer 1125 to interact with the web service provided by IFOB 1115. The software may include a browser on shared computer 1125 that is configured to interact with the web service provided by IFOB 1115.

Figure 12:
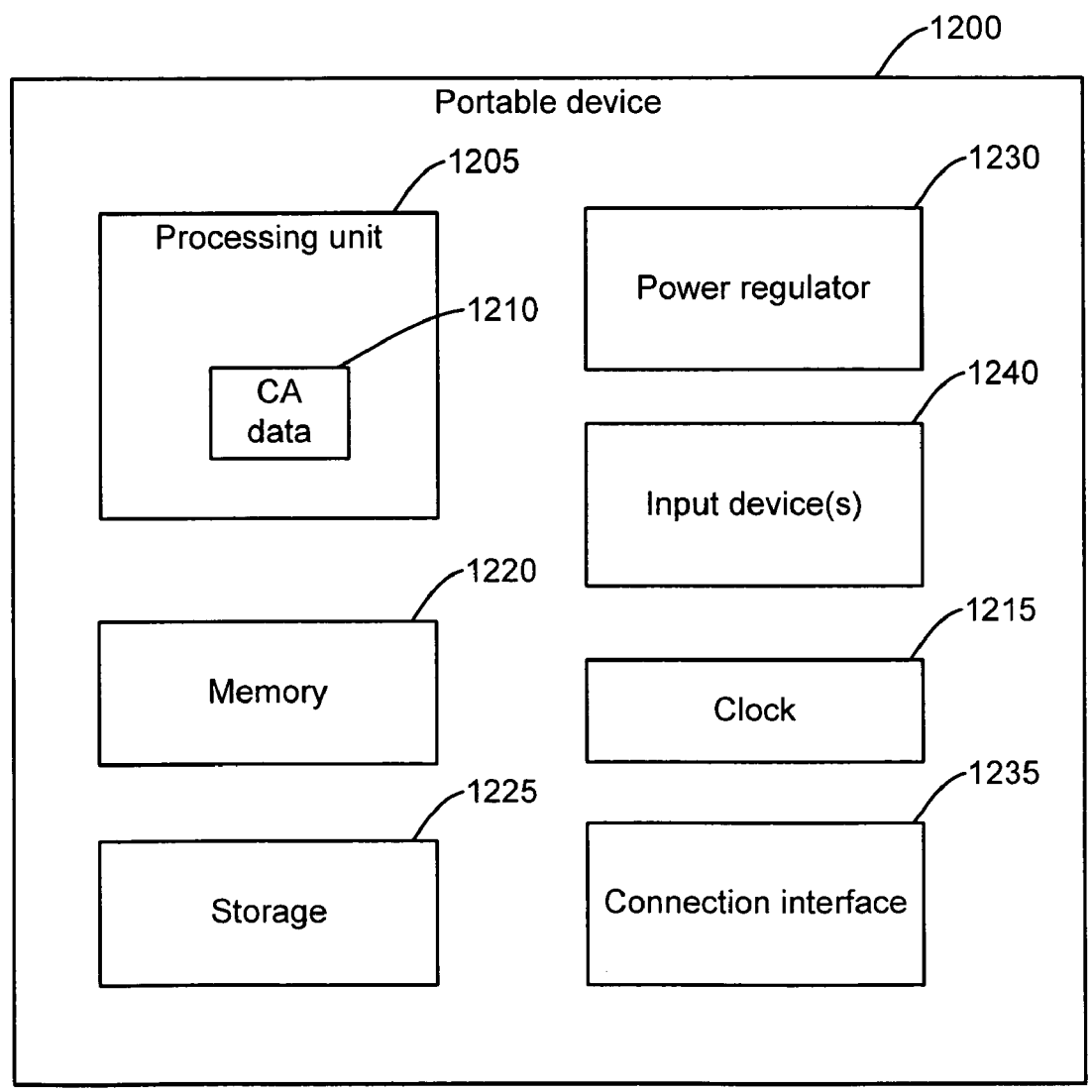
FIG. 12 shows an example portable device for implementing the described systems and methods.

FIG. 12 shows an example portable device 1200 for implementing the described systems and methods. Portable device 1200 may be any type of computing device. In its most basic configuration, portable device 1200 typically includes at least one processing unit 1205, memory 1220, storage 1225 and connection interface 1235.

Depending on the exact configuration and type of computing device, memory 1220 may be volatile (such as RAM), non-volatile (such as ROM, flash memory, etc.) or some combination of the two. Processing unit 1205 may be any type of processing unit with a processor and a memory controller. Processing unit 1205 may include functionalities associated with a CA. For example, data 1210 associated with a digital certificate may be embedded in processing unit 1205.

Portable device 1200 may also include storage 1225 including, but not limited to, flash memory, magnetic or optical disks or tape, or the like. Computer storage media includes volatile and nonvolatile memory and storage implemented in any method or technology for storage of information such as computer readable instructions, data structures, program modules or other data. Memory 1220 and storage 1225 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by portable device 1200. Any such computer storage media may be part of portable device 1200.

Portable device 1200 may also include connection interface 1235. Such connection interface 1235 enables portable device 1200 to connect to other devices. Connection interface 1235 may include any type of communication mechanisms, such as USB, fire wire, Wi-Fi, RF, Infrared, optical, or the like. The signals used by connection interface 1235 to communicate with other devices are examples of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Portable device 1200 may include a timing device, such as clock 1215. Clock 1215 provides a temporal reference to portable device 1200, which can be used to determine whether states in memory 1220 or storage 1225 are valid. Portable device 1200 may contain a power regulator 1230 to control the power from a host computing device and to supply the power to the processing unit 1205 and other components. Portable device 1200 may also have input device 1240 such as a biometric detection device, keyboard, mouse, pen, voice input device, touch input device, etc. All these devices are well know in the art and need not be discussed at length.

While the preferred embodiment of the invention has been illustrated and described, it will be appreciated that various changes can be made therein without departing from the spirit and scope of the invention.

The invention claimed is:

1. A method comprising:
    establishing a connection between a portable device and a host device;
    determining a communication link to a network provided by the host device;
    identifying the portable device to the host device;
    instantiating a process on the portable device;
    determining a first timing identifier;
    determining a second timing identifier associated with the process;
    enabling an application on the host device to interact with the process based, at least in part, on a protocol when the second timing identifier is valid relative to the first timing identifier and when the authentication data is valid, wherein enabling the application on the host device to interact with the process includes configuring the process to interact with the application provided by a server on the network through the communication link; and
    denying access to the process when the second timing identifier is invalid relative to the first timing identifier, wherein the second timing identifier is invalid when the second timing identifier represents a time that is after another time represented by the first timing identifier.

2. The method as recited in claim 1, further comprising determining states stored on the portable device, wherein the states are associated with at least one of an application, configuration, customization, or user data.

3. The method as recited in claim 2, further comprising:
    providing a backup copy of the states to the application on the server;
    requesting the backup copy to be stored on the server.

4. The method as recited in claim 2, further comprising synchronizing the states on the portable device and data managed by the application on the server.

5. The method as recited in claim 4, wherein the data managed by the application on the server includes at least one of a backup copy of the states or an updated copy of the states.

6. The method as recited in claim 2, further comprising determining whether to synchronize the states on the portable device and data managed by the application on the server based, at least in part, on a condition.

7. The method as recited in claim 6, wherein the condition includes at least one of elapsing a predetermined time period, exceeding a memory threshold, determining that updated states are available on the server, or connecting the portable device to the host device.

8. The method as recited in claim 1, further comprising requesting the application on the server to perform at least one of storing backup data, providing updated data, authenticating a user, or validating data.

9. The method as recited in claim 1, further comprising:
    receiving a request from a process on the host device to access the application on the server; and
    providing by proxy the request from the host device to the application on the server.

10. The method as recited in claim 9, further comprising:
    receiving data from the server in response to the proxy request; and
    providing the data to the host device without adding information about the server.

11. A method of communicating between computing devices comprising:
    receiving, by a portable device from a host device, a device query;
    sending, from the portable device to the host device, a reply identifying the portable device as a network device connected to the host device;
    instantiating a process on the portable device;
    receiving, by the portable device from the host device, a request for data;
    sending, from the portable device to a server on a network, the request through a communication link to the network provided by the host device;
    receiving, by the portable device from the server, data associated with the request;
    determining a first timing identifier;
    determining a second timing identifier associated with the process;
    enabling an application on the host device to interact with the process based, at least in part, on a protocol when the second timing identifier is valid relative to the first timing identifier and when the authentication data is valid, wherein enabling the application on the host device to interact with the process includes sending, from the portable device to the host device, the data provided by the server; and
    denying access to the process when the second timing identifier is invalid relative to the first timing identifier, wherein the second timing identifier is invalid when the second timing identifier represents a time that is after another time represented by the first timing identifier.

12. The method as recited in claim 11, further comprising sending, from the portable device to the host device, data generated by a process executing on the portable device along with the data provided by the server.

13. The method as recited in claim 11, further comprising:
    sending, from the portable device to the server, a copy of states stored in the portable device; and
    receiving, by the portable device from the server, confirmation that the copy has been stored on the server.

14. The method as recited in claim 11, further comprising:
    receiving, by the portable device from the host device, authentication data;
    sending, from the portable device to the server, the authentication data; and
    receiving, by the portable device from the server, an indicator of whether the authentication data is valid.

15. The method as recited in claim 11, further comprising:
    sending, from the portable device to the server, information associated with states stored in the portable device; and
    receiving, by the portable device from the server, an indicator of whether the states are valid.

16. The method as recited in claim 11, further comprising:
    sending, from the portable device to the server, a request to revalidate states stored in the portable device that have become invalid; and receiving, by the portable device from the server, data for revalidating the states.

17. The method as recited in claim 11, further comprising:
sending, from the portable device to the server, a request to update states stored in the portable device; and
receiving, by the portable device from the server, data for updating the states.

18. An apparatus comprising:
a computing module having at least one processor;
an interface module configured to communicate with a host device that includes a communication link to a network;
a memory module comprising instructions which, when executed, cause the at least one processor to:
establish a connection with the host device;
instantiate a process on the portable device;
receive data through the communication link from an application provided by a server on the network;
determine a first timing identifier;
determine a second timing identifier associated with the process;
enable an application on the host device to interact with the process based, at least in part, on a protocol when the second timing identifier is valid relative to the first timing identifier and when the authentication data is valid, wherein enabling the application on the host device to interact with the process includes providing the data received from the server to the host device; and
deny access to the process when the second timing identifier is invalid relative to the first timing identifier, wherein the second timing identifier is invalid when the second timing identifier represents a time that is after another time represented by the first timing identifier.

19. The apparatus as recited in claim 18, wherein the connection between the apparatus and the host device is a peripheral connection.

20. The apparatus as recited in claim 18, wherein the communication link is a network connection.

21. The apparatus as recited in claim 20, further comprising:
determine a request from the host device;
receive data associated with the request from the application on the server; and
respond to the request based, at least in part, on the data received from the application.

22. The apparatus as recited in claim 18, wherein the instructions further cause the one processor to forward the request from the host device to the server by proxy.

23. The apparatus as recited in claim 18, wherein the instructions further cause the one processor to:
determine states stored in the memory module;
request data from the application on the server; and
update the states based, at least in part, on the data provided by the application.

24. The apparatus as recited in claim 23, wherein the data provided by the application includes states associated with a new application for the apparatus.

25. The apparatus as recited in claim 18, wherein the instructions further cause the one processor to:
determine to backup states stored in the memory module;
send the states to an application on the server; and
receive conformation from the application that a backup copy of the states has been stored on the server.

26. An apparatus comprising:
a processor;
a memory coupled to the processor;
means for connecting the apparatus and a host device;
means for determining a communication link to a network provided by the host device;
means for retrieving states associated with a process;
means for instantiating the process on the apparatus based, at least in part, on the states;
means for determining a first timing identifier;
means for determining a second timing identifier associated with the process;
means for enabling a host device to interact with the process based, at least in part, on a protocol when the second timing identifier is valid relative to the first timing identifier, wherein means for enabling the application on the host device to interact with the process includes means for the process to interact with a server on the network through the communication link; and
means for denying the host device access to the process when the second timing identifier is invalid relative to the first timing identifier, wherein the second timing identifier is invalid when the second timing identifier represents a time that is after another time represented by the first timing identifier.

27. The apparatus as recited in claim 26, further comprising:
means for providing the states to the server; and
means for creating a backup copy of the states on the server.

28. The apparatus as recited in claim 26, further comprising:
means for receiving a request from the host device; and
means for providing the request to the server by proxy.

29. The apparatus as recited in claim 26, further comprising:
means for determining to upgrade the states;
means for receiving data from the server; and
means for updating the states using the received data.

30. The apparatus as recited in claim 26, further comprising:
means for receiving authentication data from the host device;
means for providing the authentication data to the server for validation; and
means for determining whether the authentication data is valid from the server.

31. The apparatus as recited in claim 26, further comprising:
means for giving the server access to the states;
means for determining whether the states are valid from the server.

32. The apparatus as recited in claim 26, further comprising means for revalidating the states using data provided by the server.

* * * * *